United States Patent
Bergmann et al.

(10) Patent No.: US 12,112,858 B2
(45) Date of Patent: Oct. 8, 2024

(54) FILTER AND A FUEL ASSEMBLY FOR A NUCLEAR PLANT

(71) Applicant: WESTINGHOUSE ELECTRIC SWEDEN AB, Västerås (SE)

(72) Inventors: Uffe Bergmann, Västerås (SE); Hoshiar Amin, Västerås (SE)

(73) Assignee: Westinghouse Electric Sweden AB, Västerås (SE)

(*) Notice: Subject to any disclaimer, the term of this patent is extended or adjusted under 35 U.S.C. 154(b) by 400 days.

(21) Appl. No.: 17/436,320

(22) PCT Filed: Mar. 11, 2020

(86) PCT No.: PCT/EP2020/056488
§ 371 (c)(1),
(2) Date: Sep. 3, 2021

(87) PCT Pub. No.: WO2020/182873
PCT Pub. Date: Sep. 17, 2020

(65) Prior Publication Data
US 2022/0172851 A1 Jun. 2, 2022

(30) Foreign Application Priority Data
Mar. 12, 2019 (EP) .................................. 19162334

(51) Int. Cl.
*G21C 3/32* (2006.01)
*B01D 29/00* (2006.01)

(52) U.S. Cl.
CPC ....... *G21C 3/3206* (2013.01); *B01D 29/0097* (2013.01); *Y02E 30/30* (2013.01)

(58) Field of Classification Search
CPC .... G21C 3/3206; B01D 29/0097; Y02E 30/30
See application file for complete search history.

(56) References Cited

U.S. PATENT DOCUMENTS

| 4,684,495 A | 8/1987 | Wilson et al. |
| 5,030,412 A | 7/1991 | Yates et al. |

(Continued)

FOREIGN PATENT DOCUMENTS

| DE | 29615575 U1 | 1/1997 |
| EP | 1356474 B1 | 4/2007 |

(Continued)

OTHER PUBLICATIONS

International Search Report issued in corresponding PCT Application No. PCT/EP2020/056488, dated Jun. 9, 2020, pp. 1-2.

(Continued)

*Primary Examiner* — John Kim
(74) *Attorney, Agent, or Firm* — Robinson & Cole LLP (57) ABSTRACT

A filter for separating particles from a cooling liquid in a nuclear plant is presented. The filter includes at least one passage with an inner surface, an inlet end and an outlet end, wherein the at least one passage is arranged to permit through-flow of the cooling liquid in a main flow direction (MFD) from the inlet end to the outlet end. The inner surface of the at least one passage includes at least one surface section having a structured surface forming a plurality of surface portions facing the main flow direction (MFD) of the cooling liquid and being arranged to catch the particles. Also, a fuel assembly for a nuclear plant, including a filter is presented.

21 Claims, 6 Drawing Sheets

(56) References Cited

U.S. PATENT DOCUMENTS 5,748,694 A 5/1998 King
7,149,272 B2 12/2006 Soderlund et al.

FOREIGN PATENT DOCUMENTS

| EP | 2525362 A1 | 11/2021 |
| JP | 2001116872 A | 4/2001 |
| JP | 2002323585 A | 11/2002 |

OTHER PUBLICATIONS

Notice of Reasons for Rejection issued in corresponding JP Application No. 2021-553387, date mailed Nov. 28, 2023, pp. 1-3.

FILTER AND A FUEL ASSEMBLY FOR A NUCLEAR PLANT

CROSS REFERENCE TO RELATED APPLICATION

The instant application is a U.S. National Stage application of and claims priority to PCT/EP2020/056488, filed on Mar. 11, 2020, which is a PCT application of and claims priority to EP Application No. 19162334.7, now EP 3709310 B1, filed on Mar. 12, 2019, the subject matter of both aforementioned applications are hereby incorporated by reference in their entireties.

FIELD OF THE INVENTION

The present invention relates to a filter for separating particles from cooling liquid in a nuclear plant. The invention also relates to a fuel assembly for a nuclear plant.

BACKGROUND

In a nuclear plant, for example BWR, PWR or VVER, it is important to filter the cooling liquid, such as cooling water, because debris or other particles that may be transported by the cooling water may cause defects to the cladding of the fuel rods. Defects to the cladding of the fuel rods may result in nuclear fuel, i.e. uranium leaking into the cooling water. At a larger defect, the operation of the reactor has to be interrupted and the failed fuel needs to be replaced. Such a replacement is time-consuming and expensive. Debris and other particles may also cause defects to other components in a nuclear plant, for instance pumps. The debris may consist of metal chips or wires, which are formed, for example, at different repairs of components of the plant. The debris may also have reached the plant from outside.

Efforts have been made to develop debris filters for nuclear plants and U.S. Pat. No. 7,149,272B2, EP1356474B1, U.S. Pat. No. 5,030,412A and DE29615575U1 are examples of prior art disclosures of such filters.

U.S. Pat. No. 7,149,272B2 discloses a debris filter, which works by the principle of wave-shaped mechanical obstacles. The filter comprises a stack of plates that have been stamped to the wave-shape plates shown in the figures.

EP1356474B1 describes a filter for a nuclear reactor, which filter comprises wave-shaped sheets forming a plurality of separate channels for a cooling liquid. The wave-shaped sheets are arranged beside each other to enable catching of particles in the cooling liquid.

Also, U.S. Pat. No. 5,030,412A and DE29615575U1 describe filters intended to be used for separating debris in a cooling liquid in a nuclear reactor. The filters comprise a number of parallel and curved plates.

U.S. Pat. No. 4,684,495 describes a filter formed by plates comprising spring-like fingers with holes through the plates. The spring-like fingers are punched out of a material of the plates.

Although these prior art debris filters perform well, this invention aims at an improvement regarding the capturing efficiency of debris and particles comparing to the known debris filters for nuclear plants, in particular for caching thin flexible metal wires.

It is therefore desirable to provide an improved filter with improved capturing efficiency comparing to the prior art filters and to provide a fuel assembly with the improved filter. The present invention set out below addresses this desire. The invention may also refer to a method of manufacturing a debris filter.

SUMMARY OF THE INVENTION

An object of the present invention is to provide an improved filter for a nuclear plant with improved capturing efficiency of particles in the cooling liquid flowing in the nuclear plant. An object of the present invention is also to provide an improved fuel assembly comprising a filter with improved capturing efficiency.

The above-mentioned objects are achieved by the filter and by the fuel assembly described and defined herein.

Thus, the above mentioned object(s) is/are achieved by a filter for separating particles from a cooling liquid in a nuclear plant, wherein the filter comprises at least one passage with an inner surface, an inlet end and an outlet end, wherein the at least one passage is arranged to permit through-flow of the cooling liquid in a main flow direction from the inlet end to the outlet end.

Each of the at least one passage forms a channel for the cooling liquid to permit the cooling liquid to flow along the passage from the inlet end to the outlet end during use of the filter. Thus, the cooling liquid can be conveyed through the filter in a controlled manner thanks to the at least one passage. Further, each of the at least one passage is arranged to permit the cooling medium to flow through the passage in the main flow direction, i.e. in a direction of the main stream of the cooling medium flowing through the filter from the inlet end to the outlet end of each passage. Thus, the main flow direction may be defined as vectors along a line extending from the inlet end to the outlet end, which line follows the passage. Thereby, the main flow direction may be defined in a simple and accurate manner also for different shapes of the passages.

The inner surface of the at least one passage comprises at least one surface section having a structured surface forming a plurality of surface portions facing the main flow direction of the cooling liquid and being arranged to catch the particles.

The surface section lacks holes. The structured surface is thus achieved without doing through holes through the surface section.

The at least one surface section may also be defined as a part or a portion of the inner surface of the at least one passage. Thus, the inner surface of the at least one passage comprises one or several surface sections having a structured surface, that may be a roughened surface formed by said surface portions. Each surface section may thus comprise irregularities arranged with purpose on the surface section. Thereby, the inner surface of each of the at least one passage comprises surface sections with a structured surface and other sections that have not been provided with irregularities. The structured sections are characterized by increased friction characteristics for particles flowing in the cooling liquid comparing to the other sections of the inner surface of the passage that have not been structured, i.e. that have not been provided with irregularities.

Further, each of the surface sections with a structured surface forms a plurality of surface portions facing the main flow direction of the cooling liquid and being arranged to catch the particles.

All surfaces comprise two extension directions. The surface portions are arranged such that the surface portions face the main flow direction, which means that the surface portions of the structured surface are angled in relation to the main flow direction. The surface portions may extend transversely to the main flow direction such that the extension directions of each surface portion are angled, for example perpendicularly, in relation to the main flow direction. Thereby, particles flowing in the cooling liquid may be stopped and caught in an effective manner by the surface portions of the structured surface.

Consequently, the surface portions form hurdles for particles flowing in the cooling liquid, at which surface portions the particles may be stopped, fastened and by this be caught and filtered by the filter.

Thereby, an improved filter for a nuclear plant with improved capturing efficiency of particles in the cooling liquid is provided and by this the above-mentioned object is achieved.

According to an embodiment the surface portions are arranged one after another in the main flow direction. In other words, in relation to a reference surface portion, the surface portions may be arranged such that, another surface portion or plurality of other surface portions are arranged upstream and/or downstream the reference surface portion in the main flow direction. Thereby an improved filter is achieved because with surface portions arranged one after another the probability for catching a particle in the cooling liquid increases as the particles may be stopped at several surface portions.

According to an embodiment the surface portions are arranged in rows. With rows is meant one or several lines along which the surface portions may be arranged. Each line may be arranged with an angle, for example transversely, in relation to the main flow direction. Thus, one or several surface portions may be arranged along a line. By this a yet improved filter is provided with improved capturing efficiency because a larger area of the inner surface of the passage may be provided with the surface portions which increases the probability to stop the particles.

According to an embodiment at least one of said plurality of surface portions comprises two surface sub portions arranged to approach each other towards a forward point in respect to the main flow direction. The surface sub portions are arranged to face the main flow direction. Further, the surface sub portions are arranged such that a distance between the surface sub portions decreases along the main flow direction. Each of the sub portions may comprise an outer edge and an inner edge, wherein the outer edge is arranged upstream and the inner edge is arranged downstream a middle point of the surface sub portion in relation to the main flow direction. Thus, a distance between the outer edges of two surface sub portions is greater than a distance between the inner edges of two surface sub portions. The distance between the inner edges of two surface sub portions may be zero and the inner edges can meet each other at said forward point. As an alternative the distance between the inner edges of two surface sub portions may be greater than zero and less than a size of particles intended to be caught by the filter. The surface sub portions are arranged to form an opening between the outer edges of two surface sub portions, which opening has a function of capturing particles in the cooling liquid. Thereby, a particle may be caught by the surface sub portions at the outer edges of the surface sub portions and further may be guided towards the inner edges of the surface sub portions and towards the forward point where the particle will be stopped.

According to the alternative embodiment where the distance between the inner edges of two surface sub portions is greater than zero and less than a size of particles intended to be caught by the filter, an additional opening is formed between the inner edges of the two surface sub portions. Thanks to the additional opening between the inner edges of two surface sub portions, a particle in the cooling liquid may be caught in an effective manner while the cooling liquid can pass through the additional opening during use of the filter.

Thereby, an improved filter is provided regarding a capturing efficiency and impact on flow resistance.

According to an embodiment the two surface sub portions may meet each other in the forward point. The at least one of the plurality of surface portions may be bent to form the at least two surface sub portions. The at least one of the plurality of surface portions may be bent in a smooth manner such that the surface sub portions may comprise a portion with a circular form. As an alternative the at least one of the plurality of surface portions may be bent such that a sharp edge at said forward point is formed. Thereby, a particle will be captured and stopped by the surface sub portions, for example at the forward point, in an effective manner. Consequently, an improved filter is provided with improved capturing efficiency for particles of different sizes.

According to an embodiment the structured surface i.e. the roughened surface comprises depressions forming at least some of the plurality of surface portions. Thus, the surface portions may be achieved in a simple manner by arranging depressions, or recesses, in the surface section of the inner surface of the passage. Thereby a roughened surface can be achieved.

According to an embodiment the depressions comprise elongated grooves. With elongated groove is meant slots or slits having extensions in directions orientated transversely to the main flow direction. The extension of each groove in a direction transversal to the main flow direction may then be greater that the depth of the groove. By this the particles in the cooling liquid may be caught in an effective manner along the extensions of the grooves in the direction transversal to the main flow direction.

According to an embodiment the depressions comprise spot-like depressions. With spot-like depressions is meant that a depth of the depressions may be equal or greater than the extension of the depression in a direction transversal to the main flow direction. Thus, the depressions may be arranged pointwise at the surface sections, which may decrease the energy and material consumption during a process of creating the depressions and manufacturing of the filter.

According to an embodiment the structured surface, i.e. the roughened surface comprises protrusions forming at least some of the plurality of surface portions. Thus, the surface portions may be achieved in a simple manner by arranging protrusions, i.e. units that extend from the surface of the surface sections. Thereby a roughened surface can be achieved.

The protrusions may constitute efficient traps for particles flowing in the cooling liquid. Thereby, thanks to the protrusions, the particles in the cooling liquid may be stopped in an efficient way.

According to an embodiment the protrusions comprise elongated ridges. The elongated ridges have an extension in a direction orientated transversely to the main flow direction. The extension of each ridge in the direction transversal to the main flow direction may then be greater than the height of the ridge. By this the particles in the cooling liquid may be caught in an effective manner along the extensions of the ridge in the direction transversal to the main flow direction.

According to an embodiment at least some of the elongated ridges comprise an additional elongated groove on top of the ridge. Thereby, a yet improved filter is provided with improved catching efficiency because with the additional elongated grooves on top of the ridge, the probability that particles in the cooling liquid will be caught increases.

According to an embodiment the protrusions comprise spot-lite protrusions. With spot-like protrusions is meant that a height of the protrusions may be equal or greater than the extension of the protrusions in a direction transversal to the main flow direction. Thus, the protrusions may be arranged pointwise at the surface sections, which may decrease the energy and material consumption during a process of creating the protrusions and manufacturing the filter.

According to an embodiment at least one of the depressions is followed by at least one of the protrusions in the main flow direction. With at least one protrusion following at least one depression, i.e. with at least one protrusion arranged downstream at least one depression, in relation to the main flow direction, a surface portion may be formed by both a depression and a protrusion. A protrusion may be arranged directly after a depression in the main flow direction, i.e. the depression may go over to the protrusion in the main flow direction. Thus, the surface portion may be formed partly by the depression and partly by the protrusion. Thereby, the size of the surface portion may be greater than in a case when the surface portion is formed only by a depression or by the protrusion. Consequently, an improved filter is provided.

According to an embodiment the structured surface is achieved by at least one of: plasticizing, melting, blasting or additive manufacturing. The plasticizing may for example comprise embossing, pinning, pinching, grinding or coining. The melting may for example comprise a laser-processing, electron beam or plasma. The additive manufacturing may for example comprise surface coating or 3D-printing. These processes may be used separately or in combination with each other to create the structured surface.

According to an embodiment the at least one passage comprises at least one curvature along the extension of the at least one passage. In other words, the at least one passage comprises at least one bend along the extension of the at least one passage. Thanks to the at least one curvature the cooling liquid flows through the filter such that the particles in the cooling liquid follow a wave-like shaped path. Thereby, the particles in the cooling liquid, especially elongated particles such as metal wires, may be caught at said at least one curvature in an efficient way.

Such a filter, which may be manufactured of relatively thin sheets, has a relatively low flow resistance since no components, connection members or the like are required in the passages. Thanks to the at least one curvature of the passage, i.e. of the sheets, the at least one of the separated passages enables an efficient catching of particles in the cooling liquid. In particular, elongated particles contained in the flow of the cooling liquid, may be caught by the filter device by means of the curved sheets. Further, the at least one curvature of the sheets also increases the strength to the filter, which thus may be made self-supporting and may be mounted in for instance a fuel assembly without any frame extending around the sheets.

According to an embodiment, at the at least one curvature, the inner surface of the at least one passage comprises the at least one surface section which faces substantially the main flow direction. Each curvature of the at least one curvature is arranged such that, at each curvature, the inner surface of the at least on passage comprises portions that face substantially the main flow direction and portions orientated substantially along the main flow direction. At the portions that face the main flow direction the flow of the cooling liquid meets some resistance forces due to said portions facing the main flow direction. As a consequence, also particles in the cooling liquid meet the resistance forces during passage of the cooling liquid. It is therefore advantageous to arrange the at least one surface section at the portions facing substantially the main flow to increase the probability for particles in the cooling liquid to be caught by the at least one surface section of the filter. Thereby an improved filter is provided.

According to an embodiment the filter comprises a number of interconnected plates forming the at least one passage. Thereby, the filter comprising the at least one passage may be manufactured in a simple way by interconnecting a number of plates or sheets.

The initially mentioned object is also achieved by a fuel assembly for a nuclear plant wherein the fuel assembly comprises a bottom part, a top part and a plurality of fuel rods arranged beside each other and with an interspace between each other and between the bottom part and the top part of the fuel assembly. The bottom part comprises a filter according to any one of the embodiments as above. Thereby an improved fuel assembly is provided and by this the above-mentioned object is achieved.

According to an embodiment the filter and the bottom part are arranged to guide cooling liquid into the interspace.

BRIEF DESCRIPTION OF THE DRAWINGS

In the following preferred embodiments of the invention are described with reference to the attached drawings, on which.

DETAILED DESCRIPTION

Figure 1:
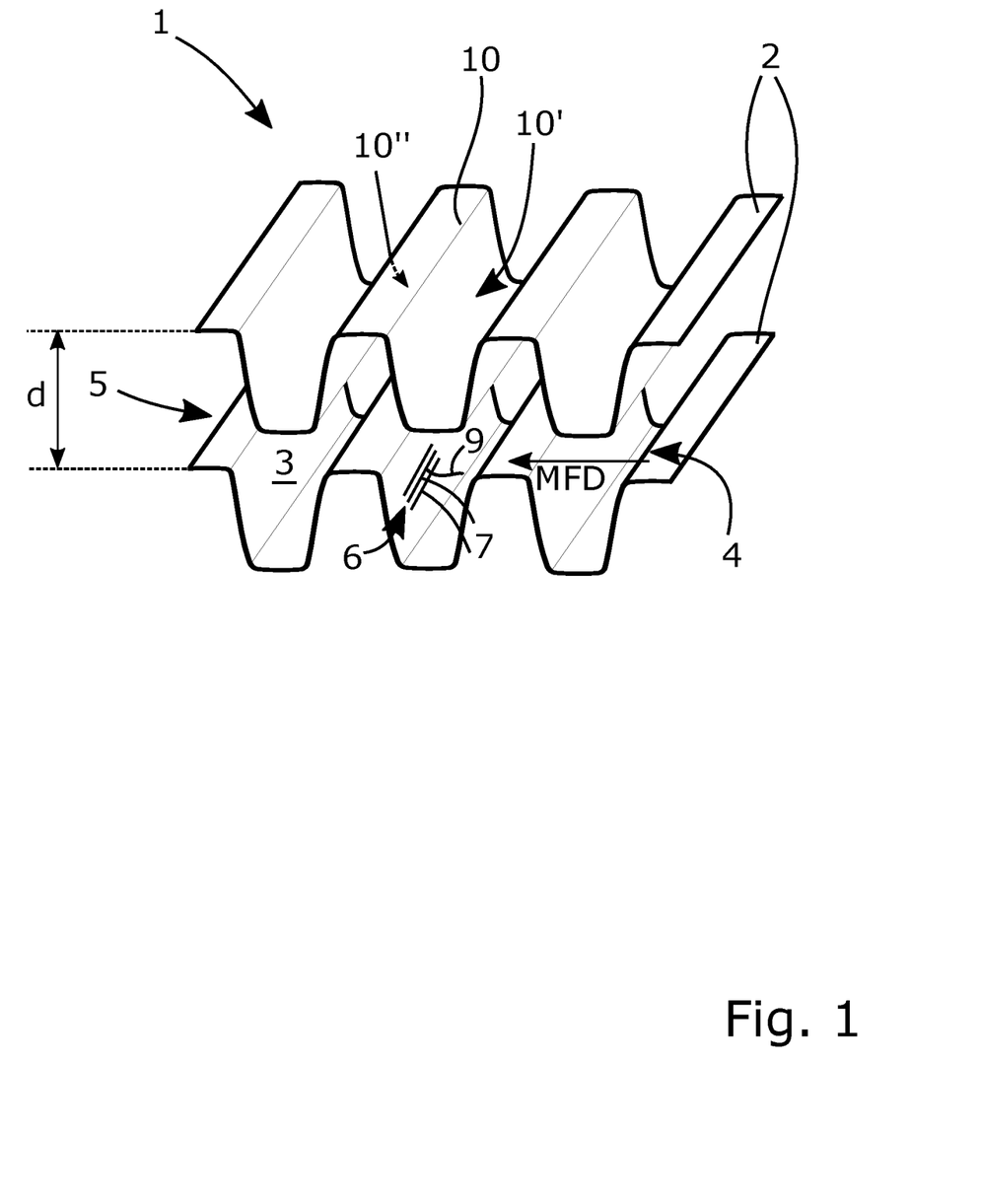
FIG. 1 is a cut view of a schematic filter with a passage comprising at least one surface section having a structured surface forming a plurality of surface portions.

FIG. 1 shows, in a schematic way, a filter 1 for separating particles from a cooling liquid in a nuclear plant. According to an embodiment, the filter 1 may comprise a number of interconnected plates 2, which plates 2 form at least one passage 3 created between two adjacent plates 2. For simplicity only two plates 2 and one passage 3 have been shown in the FIG. 1. However, the filter 1 may comprise several interconnected plates 2. The passages 3 are separated from each other and arranged beside each other by means of the plates 2. The plates 2 may be manufactured as thin sheets of a metallic material and may be interconnected to each other, for example by welding. Other suitable materials, for example ceramic materials may also be used for the plates 2.

The filter 1 comprises side walls (not shown in FIG. 1) which side walls delimit the at least one passage on the sides of the at least one passage 3. Thereby the cooling liquid may be transported through the passages 3 in a controlled manner thanks to the channels created by said plates 2 and by said side walls.

As shown in FIG. 1, the plates 2 are arranged in parallel to each other with a distance d between two adjacent plates 2. The distance d may be equal between all the plates 2 or the distance d may be different between the plates 2. Thus, the distance d between the plates 2 may vary and may be determined at a manufacturing step of the filter 1. As an effect, the size, i.e. the height or the width of the passages 3 may be adapted to different needs by adjusting the distance d between the plates 2.

As an alternative the at least one passage 3 may be formed by tubular units interconnected to each other in order to form a filter. The tubular units may for example be metallic pipes connected to each other by welding. The tubular units may be arranged such that the tubular units create one or several levels of interconnected tubular units forming a filter to enable the cooling liquid to flow through the passages arranged in one or several levels.

Each of the at least one passages 3 comprises an inner surface which is defined by surfaces of the plates 2 and surfaces of the side walls, which surfaces are facing each other and forming the passage 3. Further, each of the at least one passages 3 comprises an inlet end 4 and an outlet end 5, wherein the at least one passage 3 is arranged to permit through-flow of the cooling liquid in a main flow direction MFD from the inlet end 4 to the outlet end 5. Further, the inner surface of the at least one passage 3 comprises at least one surface section 6 having a structured surface forming a plurality of surface portions 7 extending transversely to the main flow direction MFD of the cooling liquid and being arranged to catch the particles. For simplicity two surface portions 7 on the surface section 6 have been marked. The surface portions 7 may, for example, be arranged perpendicularly to the main flow direction MFD or may be arranged at an angle different from 0 or 180 degrees in relation to the main flow direction MFD.

As mentioned above, FIG. 1 is a schematic illustration of the filter 1 and the plates 2 in FIG. 1 have been separated from each other in order to better illustrate the form of the plates and the at least one surface section 6. The plates 2 may be arranged closer to each other, i.e. the distance d may be shorter and the plates 2 may follow each other.

The above mentioned side walls (not shown in FIG. 1) that delimit the at least one passage on the sides also have a function of preventing the particles intended to be captured or stopped by the surface portions 7 of the at least one surface section 6 to move on the side or transversely and along the surface portions 7 in relation to the main flow direction MFD. Thereby the particles can be stopped partly by the side walls. Thus, thanks to the side walls the particles may be prevented from slipping or passing past the surface sections 7.

The at least one surface section 6 may cover a part of the surface of the plate 2 such that the width of the surface section 6 is equal or less the width of the plate 2. Thus, the at least one surface section 6 may extend between the side walls in a direction transversely to the main flow direction MFD and have width equal or less than the width of the plate 2.

The at least one passage 3 may comprise at least one curvature 10 along the extension of the at least one passage 3. Thus, the at least one passage 3 may be bent along the extension of the at least one passage 3 in the main flow direction MFD.

The at least one curvature 10 of the passage 3 is created by at least one of the plates 2 forming a passage 3, which plate 2 is curved, i.e. is bent along the extension of the plate 2 in the main flow direction MFD. According to some embodiments the passage 3 may be wave-formed, which means that two plates 2 forming a passage 3 have been bent in a smooth way with curvatures creating a wave-form of each plate 2.

Thanks to the curvature 10 and further to the defined wave-shape of the plates 2, elongated particles transported in the cooling liquid and having an extension may be caught by the filter 1 by means of the curvatures 10. The particles, which for any reason are transported with an extension extending substantially in parallel with the main flow direction MFD, will be caught by the filter 1 by means of the curvature 10 and wave-shape of the plates 2. The curvatures 10 and the wave-shape of the plates 2 may also contribute to improve the strength to the filter 1, which thus may be made self-supporting and may be mounted in for instance a fuel assembly without any frame extending around the plates 2.

As can be seen in FIG. 1, the at least one surface section 6 is comprised by the inner surface of the at least one passage 3 at the least one curvature 10 such that the at least one surface section 6 faces substantially the main flow direction MFD. The at least one surface section 6 may be arranged on the inner surface of the passage 3 at a first portion 10' of the curvature 10, which surface of the first portion 10' of the curvature 10 faces the main flow direction MFD. On the other hand, a surface of a second portion 10" of the curvature 10 arranged on an opposite side of the curvature 10 in relation to the main flow direction MFD and in relation to the first portion 10' of the curvature 10, is facing away from the main flow direction MFD.

At the first portion 10' that faces the main flow direction the flow of the cooling liquid meets some resistance forces due the surface of the curvature 10 that forces the cooling liquid to change the direction of the flow along the surface of the passage 3 at the curvature 10. As a consequence, also particles in the cooling liquid meet the resistance forces during passage of the cooling liquid. It is therefore advantageous to arrange the at least one surface section 6 at the portions facing substantially the main flow to increase the probability for particles in the cooling liquid to be caught by the at least one surface section 6 of the filter 1.

Thus, the surface section 6 is arranged at a portion of the curvature 10 facing the main flow direction MFD. The at least one surface section 6 may also be arranged at other positions on the inner surface of the at least one passage 3.

In FIG. 1 an example of a particle 9 is presented in a position at the surface section 6 where the particle 9 has been caught by the filter 1 and more particularly, the particle 9 has been caught by one of the plurality of surface portions 7 of the structured surface of the at least one surface section 6. Thereby, thanks to the surface portions 7, particles in the cooling liquid flowing through the filter 1 may be caught in an efficient way by being stopped by one of the surface portions 7.

Figure 2A:
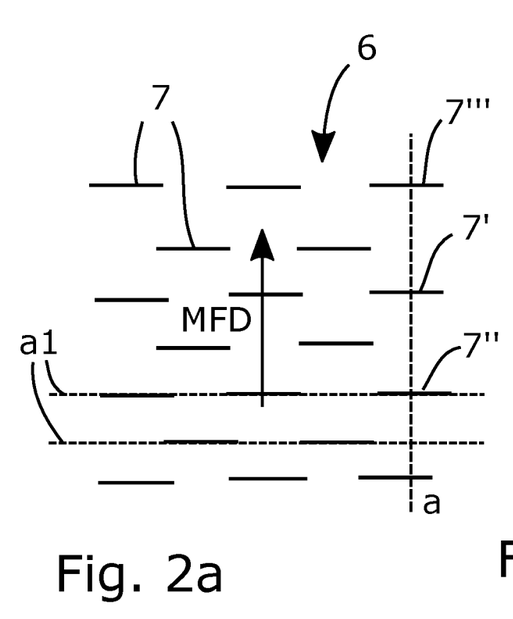
FIG. 2a illustrates the structured surface of the surface section in FIG. 1 according to an embodiment.

FIG. 2a illustrates the surface section 6 in FIG. 1, wherein the surface section 6 comprises surface portions 7 arranged one after another in the main flow direction MFD. As illustrated in the FIG. 2a, at least some of the surface portions 7 may be arranged along a first line a, which first line a may be parallel to the main flow direction MFD. Further, at least some of the surface portions 7 may be arranged offset said first line a. Thus, with a reference surface portion 7' a first surface portion 7" may be arranged upstream the reference surface portion 7' and a second surface portion 7''' may be arrange downstream the reference surface portion 7' in relation to the main flow direction MFD and along said first line a1 or offset of said first line a.

FIG. 2a illustrates also the surface portions 7 arranged in rows along at least one second line a1, wherein the surface portions 7 are arranged as separated units along the same of the at least one second line a1. In other words, there is a gap between two adjacent surface portions 7 along the at least one second line a1.

Figure 2B:
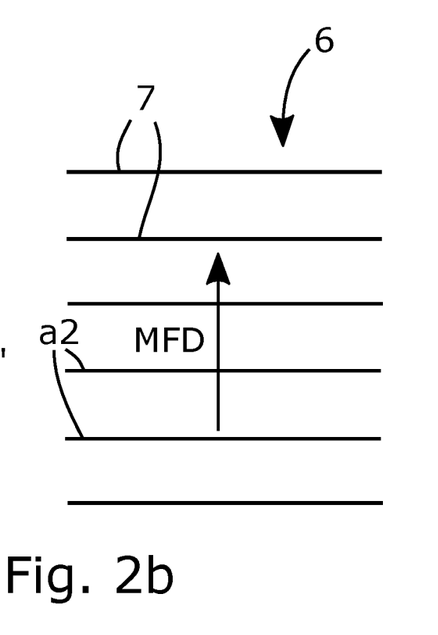
FIG. 2b illustrates the structured surface of the surface section in FIG. 1 according to an embodiment.

FIG. 2b illustrates the surface section 6 in FIG. 1, wherein the surface section 6 comprises surface portions 7 arranged in rows as uniform units unlike the embodiment illustrated in FIG. 2a with surface portions 7 as separated units. Thus, the surface portions 7 may be arranged along at least one third line a2. The third lines a2 may be parallel to each other and may be arranged transversely to the main flow direction MFD.

According to some embodiments the surface portions 7 may be arranged both as separated units and as uniform units and comprised in at least one surface section 6.

Figure 2C:
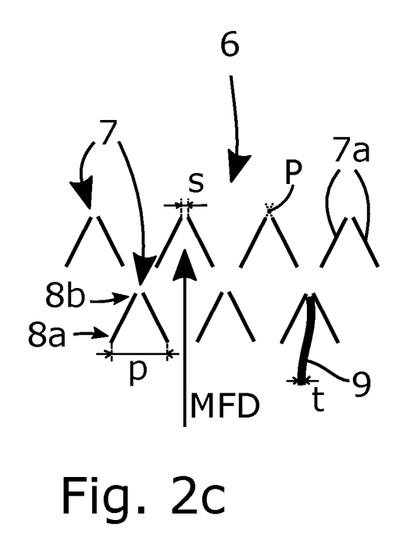
FIG. 2c illustrates the structured surface of the surface section in FIG. 1 according to an embodiment.
Figure 2D:
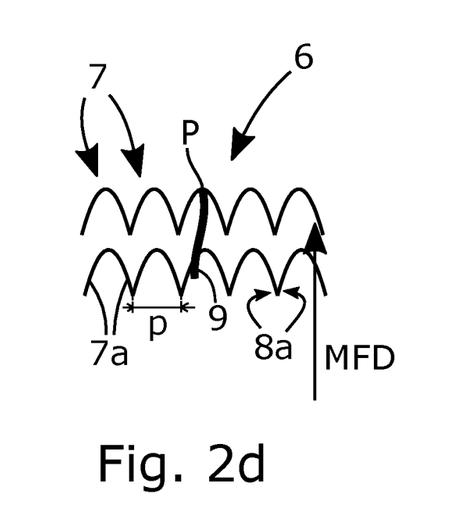
FIG. 2d illustrates the structured surface of the surface section in FIG. 1 according to an embodiment.

FIG. 2c illustrates another embodiment of the surface section 6 in FIG. 1, wherein the surface section 6 comprises surface portions 7 where each of the plurality of surface portions 7 comprises two surface sub portions 7a arranged to approach each other towards a forward point P in respect to the main flow direction MFD. As illustrated in FIG. 2c the surface sub portions 7a are arranged to face the main flow direction MFD. Further, the surface sub portions 7a are arranged such that a distance p between the surface sub portions 7a decreases along the main flow direction MFD. Each of the sub portions 7a may comprise an outer edge 8a and an inner edge 8b, wherein the outer edge 8a is arranged upstream and the inner edge is arranged downstream a middle point not shown of the surface sub portion 7a in relation to the main flow direction. Thus, the distance p between the outer edges 8a of two surface sub portions 7a is greater than a distance s between the inner edges 8b of two surface sub portions 7a. The distance s between the inner edges 8b of two surface sub portions 7a may be zero and the inner edges 8b can meet each other at said forward point P, as illustrated in FIG. 2d. As an alternative the distance s between the inner edges 8b of two surface sub portions 7a may be greater than zero and at the same time less than a size, for example a thickness t of a particle 9 intended to be caught by the filter.

Thereby, an improved filter is provided regarding a capturing efficiency and impact on flow resistance during use of the filter.

FIG. 2d illustrates another embodiment the surface section 6 in FIG. 1, wherein the surface section 6 comprises surface portions 7 each having two surface sub portions 7a that meet each other in the forward point P. As illustrated in FIG. 2d, the at least one of the plurality of surface portions 7 may be bent to form the at least two surface sub portions 7a. The at least one of the plurality of surface portions 7 may be bent in a smooth manner such that the surface sub portions 7a may comprise a portion with a circular form. The surface portions 7 may be arranged in rows and next to each other, such that two adjacent surface portions 7 may have at least one common contact point with each other, for example at the outer edge 8a of each surface sup portion 7a. By this, the probability for catching a particle 9 in the cooling liquid increases as the particles may be stopped by several surface portions 7.

As shown in FIG. 2d, the particle 9 is illustrated in a position where the particle 9 has been captured and stopped by the surface sub portions 7a, for example at the forward point P.

Figure 3A:
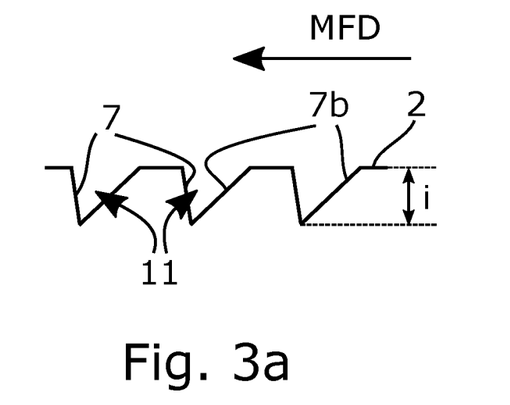
FIG. 3a is a side view illustrating the surface portions in FIG. 1 formed by depressions according to an embodiment.

FIG. 3a is a side view illustrating the surface portions 7 in FIG. 1 or FIG. 2a-2d formed by depressions 11. Thus, the structured surface of the surface section 6 may comprise depressions 11 forming at least some of the plurality of surface portions 7. The depressions 11 of the structured surface may have a depth i that for example may be between 10 and 500 µm. Thus, the structured surface can be a microstructured surface formed by the depressions 11 with the depth i that may be measured in micrometers. The depth i is measured between the surface of the plate 2 and a point of the depression 11 at a larger distance from said surface of the plate 2. As illustrated in FIG. 3a the surface portions 7, i.e. the surface portions formed by the depressions 11 that face the main flow direction MFD may be arranged with a greater inclination in relation to the main flow direction MFD comparing to secondary surface portions 7b also formed by the depressions 11 and arranged upstream the surface portions 7 in relation to the main flow direction. Thereby a particle flowing in the cooling liquid may be caught in an efficient manner by one of the surface portions 7.

The depressions may comprise elongated grooves, for instance arranged as shown in FIG. 2a or FIG. 2b.

Figure 3B:
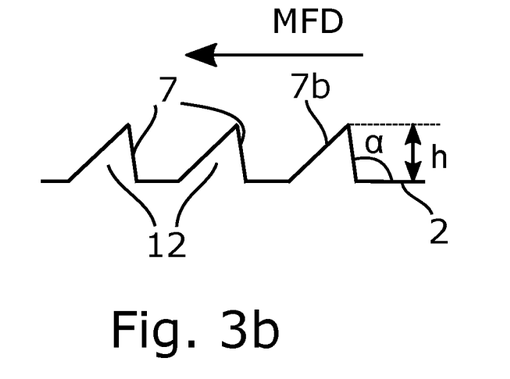
FIG. 3b is a side view illustrating the surface portions in FIG. 1 formed by protrusions according to an embodiment.

FIG. 3b is a side view illustrating the surface portions 7 in FIG. 1 or FIG. 2a-2d formed by protrusions 12. Thus, the structured surface of the surface section 6 may comprise protrusions 12 forming at least some of the plurality of surface portions 7. The protrusions 12 of the structured surface may have a height or a length h measured from the surface of the plate 2 to a point of the protrusion at a larger distance from said surface of the plate 2. The height h may for example be between 10 and 500 µm. Thus, the structured surface can be a microstructured surface formed by the protrusions 12 with the height h that may be measured in micrometers. In a similar way as according to embodiment illustrated in FIG. 3a, the surface portions 7, i.e. the surface portions formed by the protrusions 12 that face the main flow direction MFD may be arranged with a greater inclination in relation to the main flow direction MFD comparing to secondary surface portions 7b also formed by the protrusions 12 and arranged downstream the surface portions 7 in relation to the main flow direction MFD.

Further, the at least some of the plurality of the surface portions 7 are arranged with a first angle α between the surface portion 7 and the surface of a plate 2, which surface of the plate 2 is parallel to the main flow direction MFD, wherein the first angle α may be equal with 90 degrees or it may be obtuse or slightly obtuse, i.e. greater than 90 degrees. The protrusions 12 may comprise elongated ridges, for instance arranged as shown in FIG. 2a or FIG. 2b.

Figure 3C:
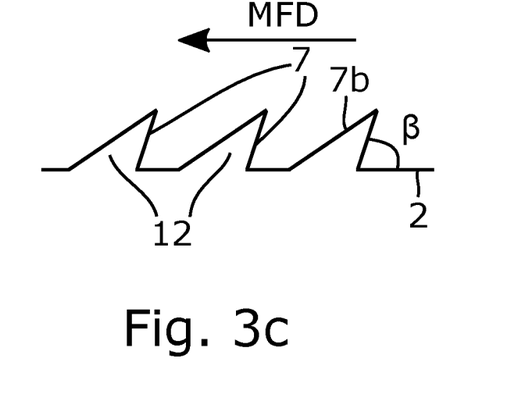
FIG. 3c is a side view illustrating the surface portions in FIG. 1 formed by protrusions according to an embodiment.

FIG. 3c is a side view illustrating the surface portions 7 in FIG. 1 or FIG. 2a-2d formed by protrusions 12 according to an embodiment. Thus, the structured surface of the surface section 6 may comprise protrusions 12 forming at least some of the plurality of surface portions 7. In a similar way as illustrated in FIG. 3b, the protrusions 12 in FIG. 3c may have a height or a length measured from the surface of the plate 2 to a point of the protrusion at a larger distance from said surface of the plate 2. The height may for example be between 10 and 500 μm. Further, the surface portions 7, i.e. the surface portions formed by the protrusions 12 that face the main flow direction MFD may be arranged with a greater inclination in relation to the main flow direction MFD comparing to secondary surface portions 7b also formed by the protrusions 12 and arranged downstream the surface portions 7 in relation to the main flow direction MFD.

The at least some of the plurality of the surface portions 7 are arranged with a second angle β between the surface portion 7 and the surface of a plate 2, which surface of the plate 2 is parallel to the main flow direction MFD, wherein the second angle β may be equal with 90 degrees or it may be acute i.e. it may be less than 90 degrees. The protrusions 12 may comprise elongated ridges, for instance arranged as shown in FIG. 2a or FIG. 2b. The protrusions 12 may be manufactured by using a 3D-printing technology.

Figure 4A:
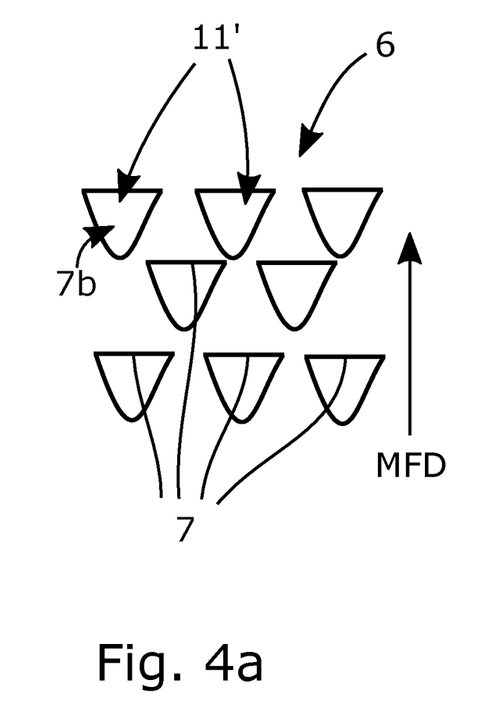
FIG. 4a illustrates the structured surface in FIG. 1 comprising spot-like depressions seen from above according to an embodiment.

FIG. 4a illustrates the structured surface 6 in FIG. 1 comprising spot-like depressions 11'. Thus, the depressions may comprise spot-like depressions 11' and the surface sections 7 may be formed by the spot-lite depressions 11'.

As illustrated in FIG. 4a, each of the secondary surface portions 7b, formed by the spot-like depressions 11', forms a smooth inlet into the spot-like depression 11'. Thereby, a particle may by guided into the spot-like depression 11' and then may by stopped by the surface section 7 formed by spot-like depressions 11'. The secondary surface portions 7b may be arranged as illustrated in FIG. 3a or in FIG. 5b.

Figure 4B:
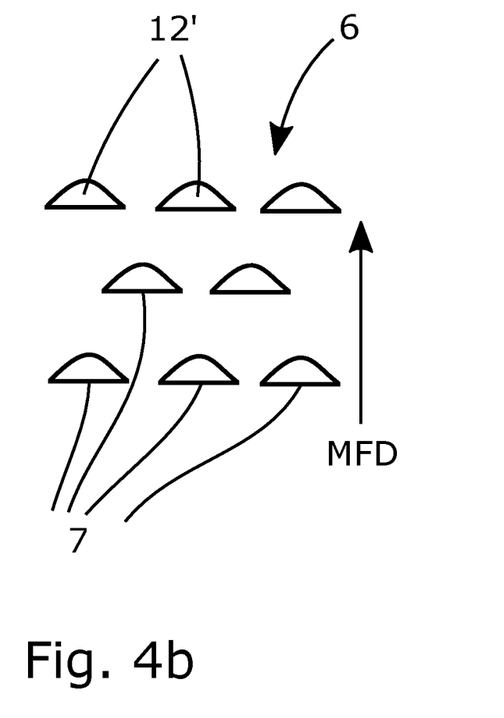
FIG. 4b illustrates the structured surface in FIG. 1 comprising spot-like protrusions seen from above according to an embodiment.

FIG. 4b illustrates the structured surface in FIG. 1 comprising spot-like protrusions 12'. Thus, the protrusions may comprise spot-lite protrusions 12' and the surface sections 7 may be formed by the spot-lite protrusions 12'. The protrusions 12' may be arranged as illustrated in FIG. 3b, FIG. 3c or FIG. 5a.

Figure 5A:
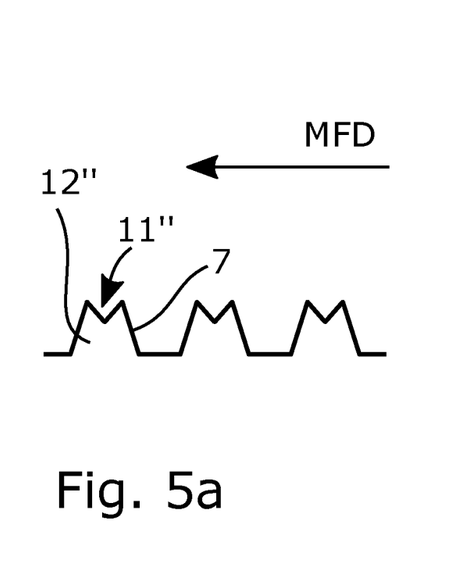
FIG. 5a is a side view illustrating the surface portions in FIG. 1 formed according to an embodiment.

FIG. 5a is a side view illustrating the surface portions 7 in FIG. 1 formed as elongated ridges 12", wherein each of the elongated ridges 12" comprise an additional elongated groove 11" on top of the ridge 12", for instance arranged as shown in FIG. 2a or FIG. 2b.

Figure 5B:
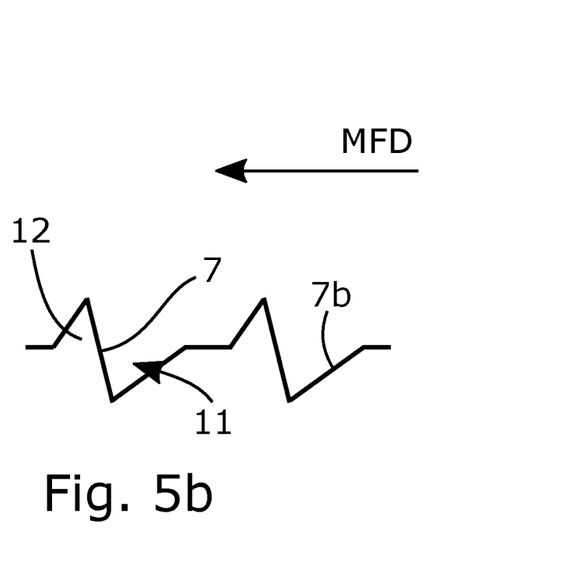
FIG. 5b is a side view illustrating the surface portions in FIG. 1 formed by protrusions following depressions according to an embodiment.

FIG. 5b is a side view illustrating the surface portions 7 in FIG. 1 formed by protrusions 12 following depressions 11. Thus the surface portions 7 may be formed such that at least one of the depressions 11 may be followed by at least one of the protrusions 12 in the main flow direction MFD, for instance arranged as shown in FIG. 2a or FIG. 2b.

The structured surface may be achieved by at least one of: embossing, laser-processing, blasting or 3D-printing.

Figure 6:
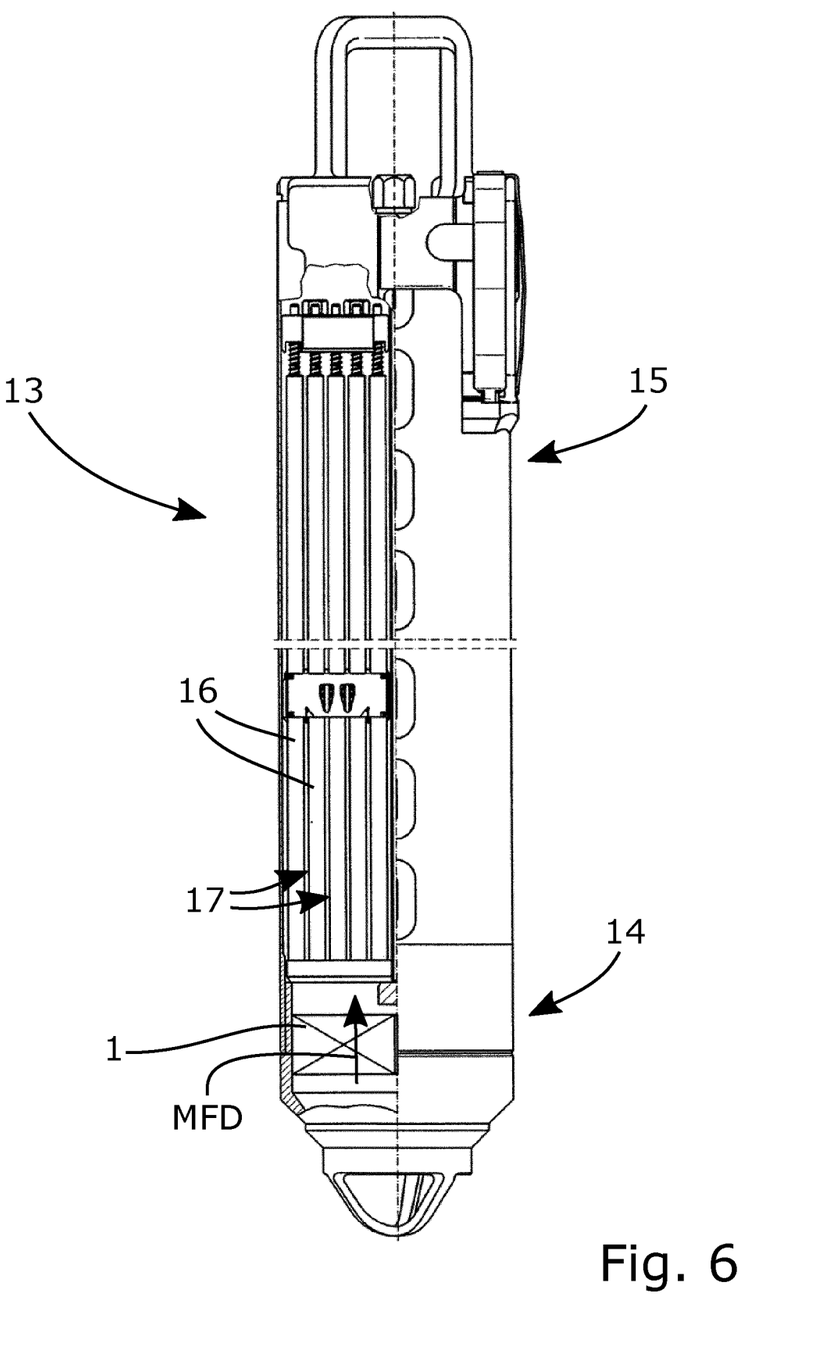
FIG. 6 is a cut view of a schematic fuel assembly for a BWR reactor comprising a filter according to an embodiment and FIG. 7 is a cut view of a schematic fuel assembly for a PWR reactor comprising a filter according to an embodiment.

FIG. 6 is a cut view of a schematic fuel assembly 13 for a BWR reactor comprising a filter 1. The fuel assembly 1 comprises a bottom part 14, a top part 15 and a plurality of fuel rods 16 arranged beside each other and with an interspace 17 between each other and between the bottom 14 part and the top 15 part of the fuel assembly 13. The bottom part 14 comprises a filter 1 according to an embodiment as above.

As an alternative the bottom part 14 and the filter 1 are arranged to guide the cooling liquid into the interspace 17.

Figure 7:
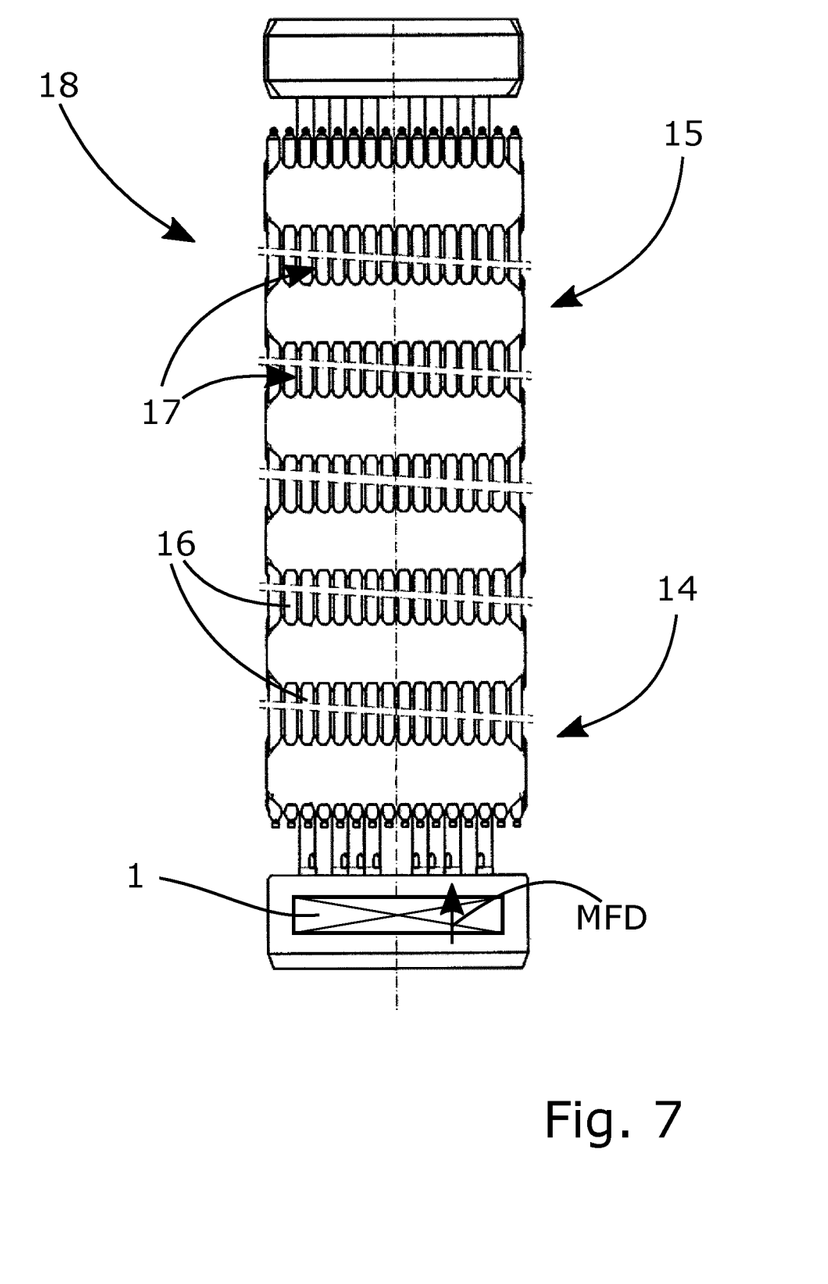

FIG. 7 is a cut view of a schematic fuel assembly 18 for a PWR reactor comprising a filter 1 according to an embodiment as above. The reference signs in FIG. 7 designate the same or similar elements as in FIG. 6.

The invention is not restricted to the described embodiment but may be varied freely at the scope of the claims.

What is claimed is:

1. A filter for separating particles from a cooling liquid in a nuclear plant, wherein the filter comprises at least one passage with an inner surface, an inlet end and an outlet end, wherein said at least one passage delimits through-flow of the cooling liquid in a main flow direction (MFD) in the at least one passage from the inlet end to the outlet end, at least one surface section arranged on the inner surface and having a structured surface forming a plurality of surface portions facing said main flow direction (MFD) of the cooling liquid to catch said particles.

2. The filter according to claim 1, wherein said surface portions are arranged one after another in the main flow direction (MFD).

3. The filter according to claim 1, wherein said surface portions are arranged in rows.

4. The filter according to claim 1, wherein at least one of said plurality of surface portions comprise two surface sub portions arranged to approach each other towards a forward point in respect to the main flow direction (MFD).

5. The filter according to claim 4, wherein said two surface sub portions meet each other in said forward point.

6. The filter according to claim 1, wherein said structured surface comprises depressions forming at least some of the plurality of surface portions.

7. The filter according to claim 6, wherein said depressions comprise elongated grooves.

8. The filter according to claim 6, wherein said depressions comprise spot-like depressions.

9. The filter according to claim 1, wherein said structured surface comprises protrusions forming at least some of the plurality of surface portions.

10. The filter according to claim 9, wherein said protrusions comprise elongated ridges.

11. The filter according to claim 10, wherein at least some of the elongated ridges comprise an additional elongated groove on top of the ridge.

12. The filter according to claim 9, wherein said protrusions comprise spot-lite protrusions.

13. The filter according to claim 9, wherein at least one of the depressions is followed by at least one of the protrusions in said main flow direction (MFD).

14. The filter according to claim 1, wherein the structured surface is achieved by at least one of: plasticizing, melting, blasting or additive manufacturing.

15. The filter according to claim 1, wherein the at least one passage comprises at least one curvature along the extension of the at least one passage.

16. The filter according to claim 15, wherein at the at least one curvature, the inner surface of the at least one passage comprises said at least one surface section which faces substantially said main flow direction (MFD).

17. The filter according to claim 1, wherein the filter comprises a number of interconnected plates forming the at least one passage.

18. The filter according to claim 1, wherein the structured surface is micro-structured.

19. The filter according to claim 1, wherein the plurality of surface portions is without through holes.

20. A fuel assembly for a nuclear plant, wherein the fuel assembly comprises a bottom part, a top part and a plurality of fuel rods arranged beside each other and with an interspace between each other and between the bottom part and the top part of the fuel assembly, wherein the bottom part comprises a filter according to claim 1.

21. The fuel assembly according to claim 20, wherein the filter and the bottom part are arranged to guide cooling liquid into the interspace.

\* \* \* \* \*